8214X
R. MILLER.
HEMP BRAKE.
Patented May 23, 1834.
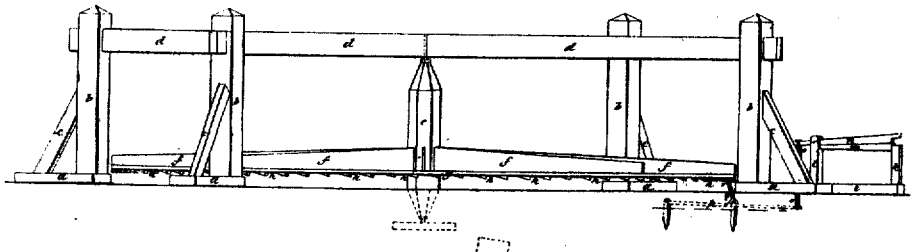
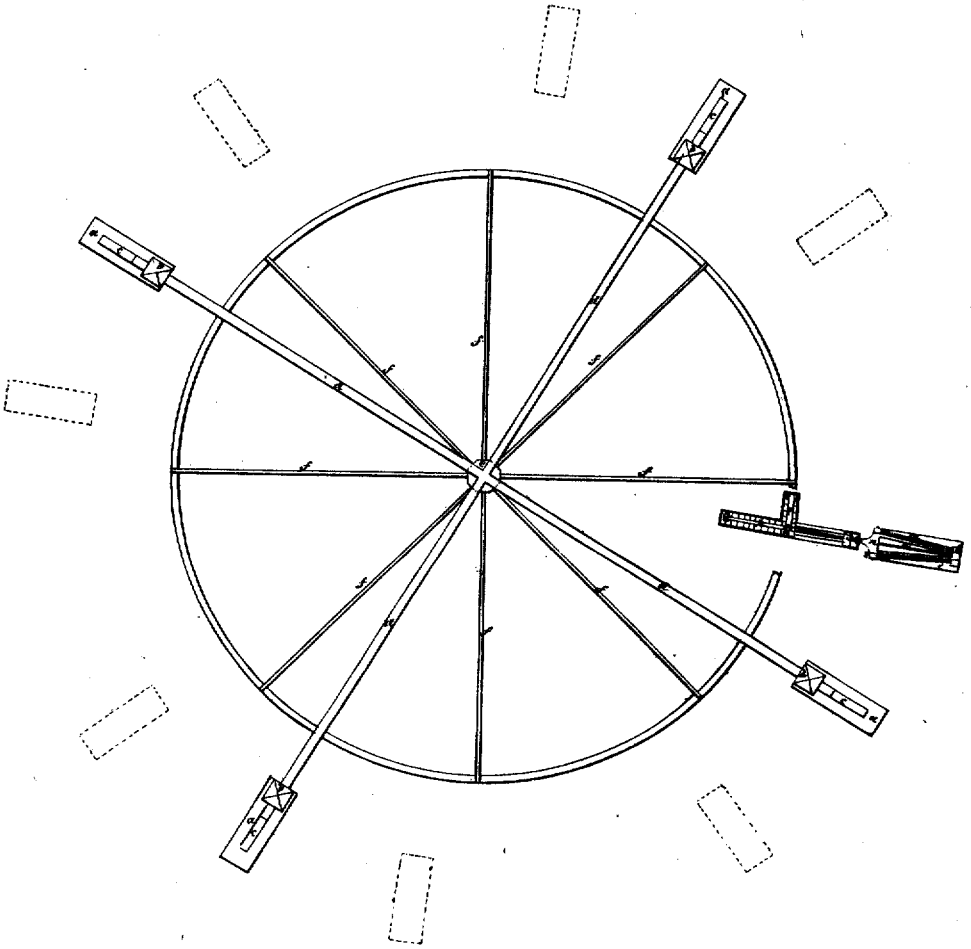
THE NORRIS PETERS CO., PHOTO-LITHO., WASHINGTON, D. C.

5/23/1834 8214X

May 23.1834 363

Robert Miller of Glasgow, Kentucky

Letters Patent.

The schedule referred to in these Letters Patent and making part of the same containing a description in the words of the said Robert Miller himself of his improvement in the machine for breaking hemp and Flax.

To all to whom these presents shall come

Be it known that I, Robert Miller of Glasgow in the County of Barren & State of Kentucky, have invented a new and useful improvement in the cleaning and separating of Hemp & flax from their woody parts, and that the following is a full and exact description of the construction and operation of the said Machine as invented & improved by me A strong frame is erected by two beams crossing each other at right angles & firmly braced to their uprights, it supports a shaft carrying a wheel from 30 to 42 feet diameter which circulates horizontally (by horse or other power) within one foot of the ground to the lower side of its narrow rim, are fastened right angled triangular cogs at their own length apart; an oblong piece 2½ inches thick 3 to 4 broad & 9 to 12 long, being cut diagonally forms two such, their acute angles are 14 to 17 degrees, they are shod with hoop iron at least 1½ inch broad.

Four feet diameter around the rim is allowed for the horses path just beyond which rises the uprights of the frame and to that line comes the tails of the brakes their heads extending outward diametrically from the shaft, there are eight brakes to a complete machine four heavy breakers and four light cleaners each formed from a solid piece of black gum 7 feet long 16 inches wide & four thick. their solid heads are six inches long seconds of the breakers it's 5 five feet body eight inches and tails 16 to 18, —

Drawing

The breakers have swords 8 inches apart at the body and 2 at the
head but the swords of finishers are only half length and 2 inches apart
anywhere, on this latter principles 6 hand finishing brakes are made
lest accident disable any of those in the machine for a moment
& to employ the hands within door during wet weather
Each brake moves about 2½ feet high upon a frame composed
of three pieces a sill 7 feet by 2, & 8 inches thick into which
head and tail blocks are firmly set they are 6 inches thick the
latter is 2 feet broad & 4 high from 2½ upwards there are 16 inches
wide cut out of its midst in which the brake plays upon an
iron pivot: The former is covered with leather well stuf-
-fed with gum elastic or curled hair to prevent the destruction
of brakes, Grooves in these blocks receive the lower swords or
slats in which they are moveable. to render them efficient in
every kind of hemp and to facilitate the cleaning they are 6 inches
broad at the head but only 3 at the body
Near the midst of each brake rests the end of a lively ash
spring pole 12 feet long it other end is fastened in two uprights
Directly under the cogs and pointing with the rim when in motion
are placed triangular levers with legs 2½ feet long conjoined
angle works upon a pivot the legs extending to a right line between
the shaft and brake on which moves the driving lever a straight
piece of 8 or more feet long; its outer end passing under the
horse to at least 4 feet beyond the cogs till under the tail
of the brake to which it is yoked by a bow of tough white oak
or hickory the in end works upon a pivot & is moveable to adjust
the triangular levers to the cogs directly under which its lower
limb is loosely attached to the driving lever, ditches of one
foot broad & deep having been dug & lined sides and bottoms with
plank for these levers to move in and that part under the horse
covered with small platforms
Upon the end of the upper limb of each triangular lever is
placed a cast iron friction wheel of 1½ to 2½ inches diameter which remove four fifths of the friction as they roll over the iron
faces or the inclined planes of the cogs three pins rise out of the
tail of each brake called regulators because removing the yoke
from one to another elevates or depresses the head of the brakes to any
desired height over each spring hole is a guard coming out
of the tail block, which causes the brake to return from a given
elevation, — Each hand is furnished with a rake the pins
of which are one foot long with it he occasionally removes the
accumulating shives & by a certain motion brings into one place
all that have lint attached to them these heretofore totally lost
are lifted in burdens & cleaned in the same manner as hemp
The wheel put into motion each cog in passing the friction wheels
depresses the movable limbs of the triangles and with them the
outer ends of the drawing levers and tails of the brakes elevating
their heads to any regulated height, whence the spring poles and
their guards throw them forcibly down again, thus perpetuating
by the simple action & reaction of levers for the triangles serve only
to remove the drawing levers out of the horses way, they lose
power and are wholly unnecessary with steam or water, Eight hands are the full complement of a machine and
move in the following order, A, stands upon, (say the right side of a brake and puts in his armful
of raw hemp moving it skillfully at every rise of the brake, until
the woody parts are chiefly driven out, when he turns to the finisher
at the moment C, leaves it and is succeeded by B on the left side with
his rough hemp who also turns to his finisher as D, quits it. Thus
alternately & continually occupying the eight brakes without
interrupting each other and each performing the work of three or four
men by mere activity by the labour being small, An odd cog is necessary to the successive fall of the brakes
each pair of which stand diametrically opposite to each other
and move simultaneously sounding as one . . .

The four brakes occupy the cardinal points forming a square 366. 5, 23, 1834 8214 x void of declination and divide time as 1. 2. or a whole and half cogs
The finishers stand in the intermediate spaces forming a distance also but
upon the line of the greatest possible declination or 45° from the others
The two squares are the algebraic signs of addition and multiplication
being parents of all things of art or science & the four sounds stand
thus 1. 2. √4. √8 their arithmetical progression memorializes the
origin of the present vulgar division of inches and their geometrical
that of the scale of Music
The discovery of the last is ascribed to the fabled Pythagoras
who in this manner distinguished the sounds of Vulcans sledges whence
the machine is called the Pythagorean hemp brake.
To my original invention is now added ten improvements
for which also a right is claimed as follows,
1. cogs in the form of an inclined plane, 2, cast iron friction
wheels, 3, Iron faced cogs, 4 Stuffed head blocks, 5, Guards
to the spring poles, 6. regulators in the brakers 7. Movable slats,
and their forms, 8, finishing brakes, of equal swords, both for
the machine and hand 9 cleaning the offals 10. Adjusting the
triangles ——
One horse moves the eight brakes with ease and fifteen to
forty hundred weight may be cleansed in one day (besides the
offal) according to the weather and the degree of watering which
the hemp has received Witnesses
Robert Miller

[illegible] J. Helm
13 P. [illegible]

No Drawing

Exd
W.J.C
(May 23. 1834)
(1560 words)